(12) United States Patent
Boland

(10) Patent No.: US 9,475,465 B2
(45) Date of Patent: Oct. 25, 2016

(54) WINDSCREEN WIPER DEVICE

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 134 days.

(21) Appl. No.: 14/365,737

(22) PCT Filed: Dec. 14, 2011

(86) PCT No.: PCT/EP2011/072687
§ 371 (c)(1),
(2), (4) Date: Sep. 25, 2014

(87) PCT Pub. No.: WO2013/087098
PCT Pub. Date: Jun. 20, 2013

(65) Prior Publication Data
US 2015/0020338 A1    Jan. 22, 2015

(51) Int. Cl.
*B60S 1/38* (2006.01)
*B60S 1/40* (2006.01)

(52) U.S. Cl.
CPC ............... *B60S 1/40* (2013.01); *B60S 1/3808* (2013.01); *B60S 1/3887* (2013.01); *B60S 1/3891* (2013.01); *B60S 1/3894* (2013.01); *B60S 1/3877* (2013.01)

(58) Field of Classification Search
CPC .. B60S 1/3886; B60S 1/3887; B60S 1/3893; B60S 1/3848; B60S 1/38; B60S 1/3808; B60S 1/3891; B60S 1/3894; B60S 1/381
See application file for complete search history.

(56) References Cited

U.S. PATENT DOCUMENTS

2009/0320230 A1* 12/2009 Boland ................. B60S 1/3851
15/250.32

FOREIGN PATENT DOCUMENTS

| DE | 10139104 A1 | 3/2003 |
| DE | 102008017249 A1 | 10/2009 |
| EP | 2127969 A2 | 12/2009 |
| EP | 2159115 A1 | 3/2010 |
| EP | 2 241 484 A1 | 10/2010 |
| WO | WO2007/122569 A2 * | 11/2007 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper device of the flat blade type comprising an elastic, elongated carrier element, as well as an elongated wiper blade of a flexible material having one groove, in which groove a longitudinal strip of the carrier element is disposed. Free ends of the wiper blade are connected to a respective connecting piece. The wiper blade is provided with a spoiler and at least one connecting piece having an internal reinforcement rib connecting lateral sides of the connecting piece. The spoiler is removed along a portion of the length of the wiper blade at a free end of the wiper blade facing the connecting piece. In the mounted position the internal transverse reinforcement rib; abuts the spoiler.

10 Claims, 3 Drawing Sheets

WINDSCREEN WIPER DEVICE

BACKGROUND OF THE INVENTION

1. Technical Field

The invention relates to a windscreen wiper device of the flat blade type comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein free ends of the wiper blade are connected to a respective connecting piece, which windscreen wiper device comprises a connecting device for an oscillating wiper arm, and wherein the wiper blade is provided with a spoiler at a side thereof facing away from the windscreen to be wiped.

2. Related Art

Such a windscreen wiper device is generally known. The prior art windscreen wiper device is in particular designed as a "flat blade" or "yokeless blade", wherein use is no longer made of several yokes pivotally connected to each other, but wherein the wiper blade is biased by the carrier element, as a result of which it exhibits a specific curvature. One drawback of the prior art windscreen wiper device is the fact that the connecting pieces (in practice also called "end caps") and the wiper blade are not connected in a durable, solid manner. Particularly, when high forces are exerted on the wiper blade, the wiper blade may come loose from the connecting pieces. As a result, the life span of the prior art windscreen wiper device may be seriously shortened.

SUMMARY OF THE INVENTION

The object of the invention is to overcome this drawback of the prior art as indicated above, in particular to provide a windscreen wiper device wherein the wiper blade may not come loose from the connecting pieces.

In order to accomplish that objective, a windscreen wiper device of the kind referred to in the introduction is characterized according to the invention in that at least one connecting piece comprises an internal reinforcement rib connecting lateral sides of the connecting piece, wherein the spoiler is removed along a portion of the length of the wiper blade at a free end of the wiper blade facing towards the connecting piece, and wherein in mounted position the internal reinforcement rib abuts the spoiler. In the framework of the present invention the connecting piece is in the form of an end cap, wherein the reinforcement rib is located inside the end cap, and wherein the end cap and the internal reinforcement rib are preferably made of one piece of plastic material. In the alternative, the end cap and the reinforcement rib are made of plastic, but overmoulded on a metallic part in order to increase the stiffness thereof. the internal reinforcement rib is particularly a reinforcement upper wall portion of the end cap bridging the lateral sides thereof. Particularly by slidingly mounting the end cap over the respective free end of the wiper blade, the reinforcement rib ensures that the lateral sides of the connecting piece are firmly gripping the wiper blade laterally from the outside, so that a reliable interconnection of the connecting piece and the wiper blade is obtained. The abutting cooperation between the internal reinforcement rib and the spoiler increases the rigidity of the spoiler. The wiper blade is particularly made of an elastomeric material through an extrusion operation.

Because the connecting piece is connected to the wiper blade without any connection between the connecting piece and the strip, the connecting pieces close the groove in a dust tight and/or watertight manner. This implies that any decrease in mobility between the wiper blade and the strip due to any dust inside the groove is avoided, whereas any corrosion of the strip due to any (rain) water inside the groove can be avoided as well.

It is noted that the present invention is not restricted to windscreen wiper devices for cars, but that it also relates to windscreen wiper devices for rail coaches and all other (fast) vehicles.

In a preferred embodiment of a windscreen wiper device in accordance with the invention the spoiler is cut away, wherein in mounted position the internal reinforcement rib abuts a straight free end of the spoiler. The cutting operation ensures that spoiler is locally removed in a reliable and controllable manner. Preferably, the spoiler is locally removed, preferably cut, in its entirety.

In another preferred embodiment of a windscreen wiper device according to the invention the connecting piece comprises engaging members sidewardly engaging the wiper blade from the outside, wherein the engaging members comprise retaining means for retaining the wiper blade onto the connecting piece. Particularly, the engaging members and the retaining means are in one piece. Preferably, a moulding operation would ensure that the engaging members and the retaining means can be formed in a reliable and controllable manner, without high costs as far as additional tools and equipment are concerned.

In another preferred embodiment of a windscreen wiper device in accordance with the invention the engaging members and the retaining means are formed by inwardly bent parts of edges of the lateral sides of the connecting piece.

In another preferred embodiment of a windscreen wiper device according to the invention a cross plane through a free end of the internal reinforcement rib extends through the retaining means.

In another preferred embodiment of a windscreen wiper device in accordance with the invention the retaining means comprises at least one sidewardly extending gripping tooth for gripping an intermediate web of the wiper blade. Particularly, the retaining means comprises at least two sidewardly extending, opposing gripping teeth in the form of hooks, and wherein the hooks are bent in a direction away from the connecting device in order to block any movement of the wiper blade in a direction away from the connecting piece. In case the gripping tooth is in the shape of a hook bent in a direction towards the connecting piece, any movement of the wiper blade in a direction towards the connecting piece may be blocked by an end wall of the connecting piece, whereas any movement of the wiper blade in a direction away from the connecting piece is blocked by the hook. In other words, because the hook and the end wall being preferably present in one connecting piece at one end of the wiper blade are responsible for blockage of the wiper blade in the two directions, the connecting piece at the other end of the wiper blade may have an opening at its free end.

In another preferred embodiment of a windscreen wiper device according to the invention the lateral sides of the connecting piece are movable between a first position facing away from the wiper blade, wherein the connecting piece is disconnected from the wiper blade, and a second position facing towards the wiper blade, wherein the connecting piece is connected to the wiper blade. Preferably, the lateral sides are first moved laterally outwards with the help of a special tool or by hand, so that the connecting piece can be freely slided onto the respective free end of the wiper blade. Afterwards, the lateral sides are allowed to move laterally inwards, i.e. allowed to spring back due to the resiliency of the material of the connecting piece, wherein the internal reinforcement rib bridging the lateral sides subsequently ensures that the opposite gripping teeth firmly engage the wiper blade laterally from the outside.

THE DRAWINGS

The invention will now be explained in more detail with reference to figures illustrated in a drawing, wherein.

DETAILED DESCRIPTION OF PREFERRED EMBODIMENTS

Figure 1:
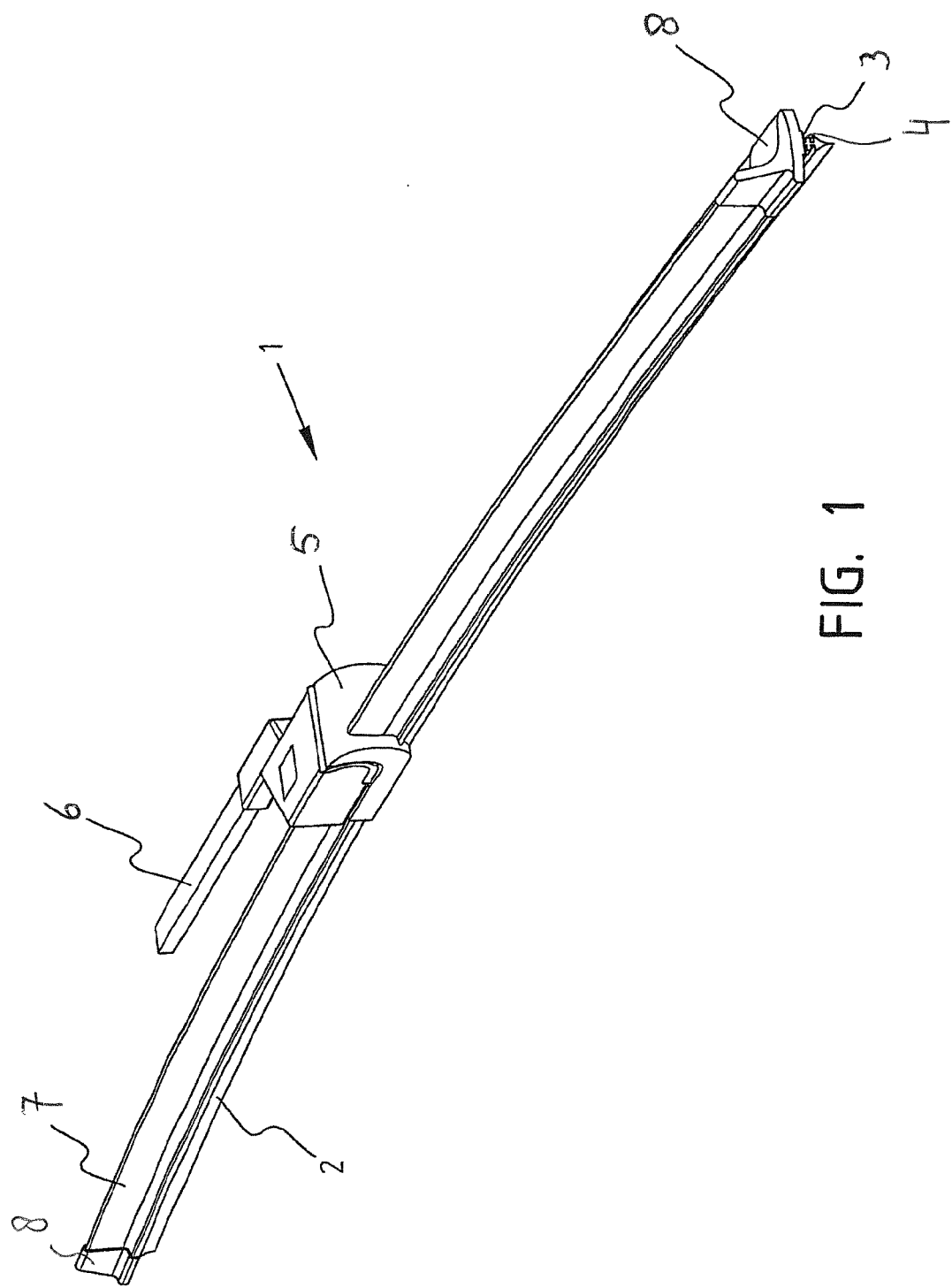
FIG. 1 is a perspective, schematic view of a windscreen wiper device in accordance with the invention.

FIG. 1 shows a preferred variant of a windscreen wiper device 1 according to the invention. the windscreen wiper device 1 is built up of an elongated wiper blade 2 made of an elastomeric material. the wiper blade 2 comprises a central longitudinal groove 3, in which a longitudinal strip 4 or flexor made of spring band steel is fitted. the strip 4 forms a flexible carrier element for the rubber wiper blade 2, as it were, which is thus biased in a curved position (the curvature in operative position being that of a windscreen to be wiped).

The windscreen wiper device 1 is further equipped with a connecting device 5 for an oscillating arm 6, and a spoiler 7 made in one piece with the wiper blade 2. At both ends of the wiper blade 2, that is on either side of the windscreen wiper device 1, connecting pieces 8 are provided.

Figure 2:
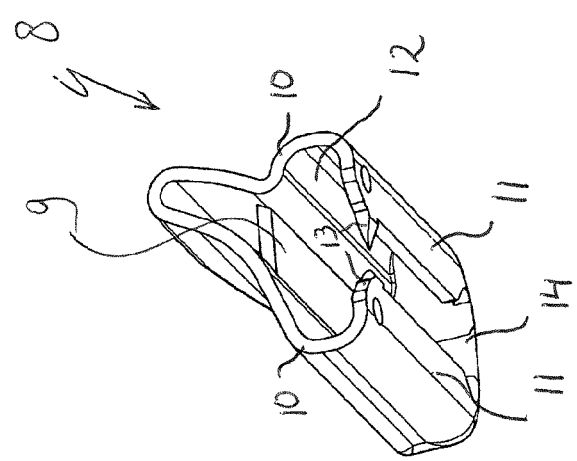
FIG. 2 is a perspective, schematic view of an connecting piece or end cap used in the windscreen wiper device of FIG. 1.

As can be seen in FIG. 2, the connecting pieces or end caps 8 have a bending stiffness in transverse or lateral direction. This is realized by providing the end cap 8 with an internal reinforcement rib 9 formed by an upper wall portion of the end cap 8. the internal reinforcement rib 9 enhances the stiffness of the end cap 8 in transverse or lateral direction, allowing the end cap 8 to firmly retain the wiping blade 2 thereon.

With reference to FIG. 2, lateral sides 10 of each end cap 8 are provided with engaging members 11 made integral therewith, wherein the engaging members 11 engage around an upper part of the wiper blade 2, so as to form a groove 12 for sliding the upper part therein. the end cap 8 and the engaging members 11 can also be made of plastic over-moulded on a metallic (insert) part. Further, the engaging means 11 include sidewardly extending gripping teeth 13 made integral therewith, wherein the gripping teeth 13 grip into an intermediate web of the wiper blade 2. As shown, the gripping teeth 13 are hook-shaped, wherein the hooks are bent in a direction away from the connecting device 5, so that any movement of the wiper blade 2 in a direction towards the end cap 8 is blocked by the end wall 14 of the end cap 8, whereas any movement of the wiper blade 2 in a direction away from the end cap 8 is blocked by the hooks. The end cap 8 at the other end of the wiper bide 2 may have an opening at its free end, because the end cap 8 at the one end of the wiper blade 2 ensures blockage of the wiper blade in the two directions. It is noted that the teeth 13 only slightly penetrates the elastomeric (rubber) material of the wiper blade 2, without damaging the same.

According to the invention the end caps 8 are connected to the wiper blade 2 without any connection between the end caps 8 and the strip 4.

Figure 3:
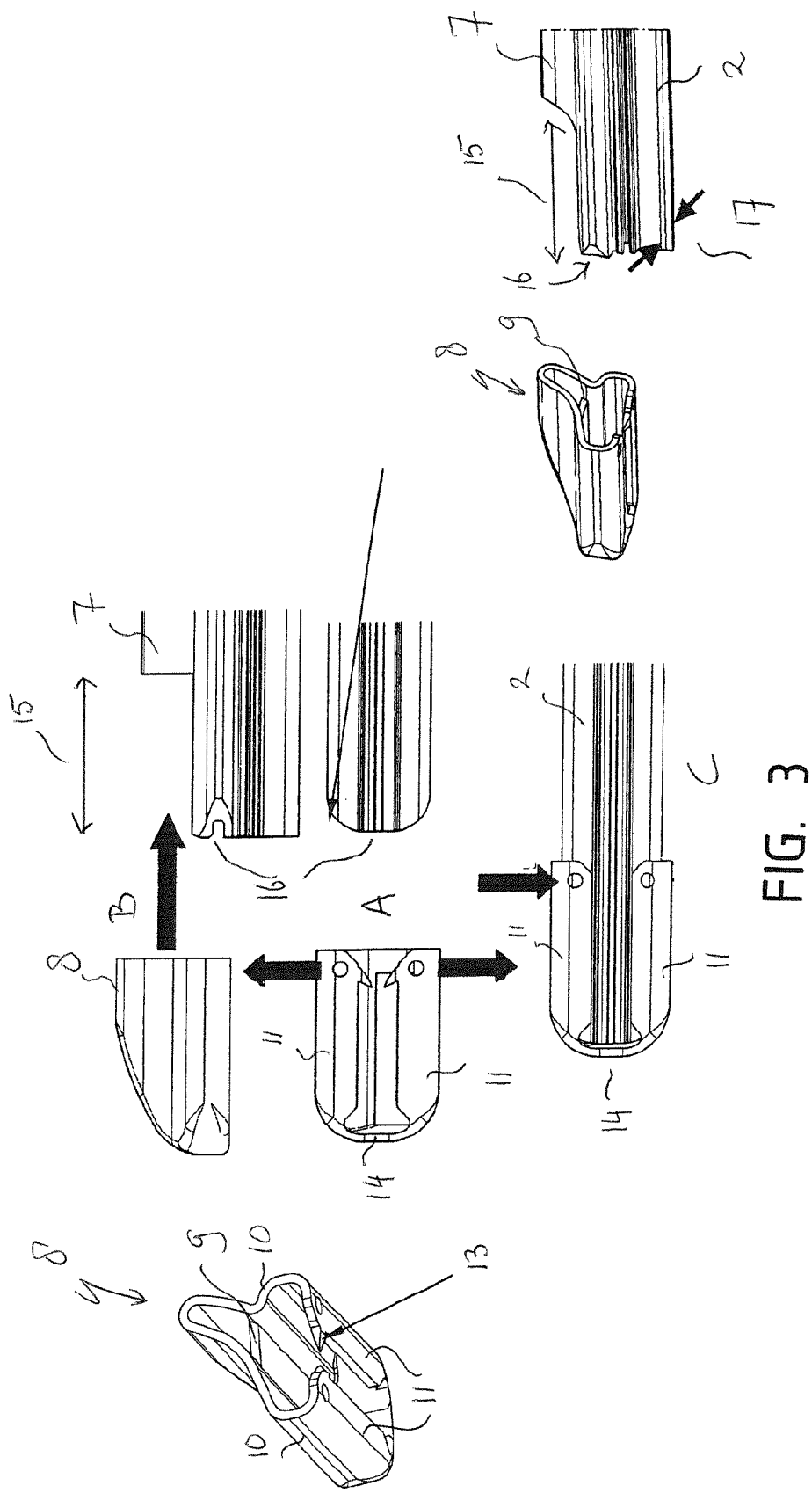
FIG. 3 in steps shows how the end cap of FIG. 2 is mounted onto a respective free end of a wiper blade used in the windscreen wiper device of FIG. 1.

With reference to FIG. 3, the spoiler 7 is removed along a portion 15 of the length of the wiper blade 2 at a free end of the wiper blade 2 facing the end cap 8. Mounting of the end cap 8 onto the free end of the wiper blade 2 is realized as follows. First, the lateral sides 10 are moved laterally outwards at the location of the gripping teeth 13, with the help of a special tool (not shown) or by hand (side view of situation A). the end cap 5 can subsequently be freely slided onto the respective free end of the wiper blade 2 (bottom view of situation B). Afterwards, the lateral sides 10 are allowed to move laterally inwards, i.e. allowed to spring back due to the resiliency of the material of the end cap 8, wherein the internal reinforcement rib 9 bridging the lateral sides 10 subsequently ensures that the opposite gripping teeth 13 firmly engage the wiper blade 2 laterally from the outside. This is shown in a bottom view of situation C. As shown in FIG. 3, the free end of the wiper blade 2, at the location of the upper part thereof, is cut in order to have a curved extremity, so that the upper part of the wiper blade 2 (designated with reference numeral 16) is able to follow a curvature of the end wall 14 of the end cap 8. In order to freely slide the end cap 8 onto the free end of the wiper blade 2, the wiper blade 2 is pinched at a location 17 thereof in order to [explanation to follow].

Although not shown in FIGS. 1, 2 and 3, but fully understood by a skilled person, the oscillating arm 6 is connected to a mounting head fixed for rotation to a shaft driven by a small motor. In use, the shaft rotates alternately in a clockwise and in a counter-clockwise sense carrying the mounting head into rotation also, which in turn draws the oscillating arm 8 into rotation and by means of the connecting device 5 moves the wiper blade 2.

The invention is not restricted to the embodiments shown, but also extends to other preferred embodiments falling within the scope of the appended claims.

The invention claimed is:

1. A windscreen wiper device of the flat blade type comprising an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein free ends of said wiper blade are connected to a respective connecting piece, which windscreen wiper device comprises a connecting device for an oscillating wiper arm, and wherein said wiper blade is provided with a spoiler at a side thereof facing away from said windscreen to be wiped, wherein at least one of said connecting pieces comprises an internal reinforcement rib connecting lateral sides of said connecting piece, wherein said spoiler is removed along a portion of the length of said wiper blade at a free end of said wiper blade facing said connecting piece, and wherein in mounted position said internal reinforcement rib abuts said spoiler and wherein said connection of each of said connecting pieces to said free ends of said wiper blade is independent of any connection between said connecting pieces and said carrier element, such that there is no direct connection between said connecting pieces and said carrier element that would serve to secure the connecting pieces against removal from said wiper element, but rather a direction connection between said connecting pieces and said wiper blade.

2. A windscreen wiper device according to claim 1, wherein said spoiler is cut away, wherein in mounted position said internal reinforcement rib abuts a straight free end of said spoiler.

3. A windscreen wiper device according to claim 1, wherein said connecting piece comprises engaging members sidewardly engaging said wiper blade from the outside, wherein said engaging members comprise retaining structure for retaining said wiper blade onto said connecting piece.

4. A windscreen wiper device according to claim 3, wherein said engaging members and said retaining structure are in one piece.

5. A windscreen wiper device according to claim 4, wherein said engaging members and said retaining structure are formed by inwardly bent parts of edges of said lateral sides of said connecting piece.

6. A windscreen wiper device according to claim 3, wherein a cross plane through a free end of said internal reinforcement rib extends through said retaining structure.

7. A windscreen wiper device according to claim 3, wherein said retaining structure comprises at least one sidewardly extending gripping tooth for gripping an intermediate web of said wiper blade.

8. A windscreen wiper device according to claim 7, wherein said retaining structure comprises at least two sidewardly extending gripping teeth in the form of books, and wherein said hooks are bent in a direction away from the connecting device in order to block any movement of said wiper blade in a direction away from said connecting piece.

9. A windscreen wiper device according to claim 1, wherein said lateral sides of said connecting piece are movable between a first position facing away from the wiper blade, wherein said connecting piece is disconnected from said wiper blade, and a second position facing towards the wiper blade, wherein said connecting piece is connected to said wiper blade.

10. A windscreen wiper device according to claim 1, wherein said at least one of said connecting pieces and said reinforcement rib are made of plastic, but overmoulded on a metallic part in order to increase the stiffness thereof.

* * * * *